J. GANGLOFF.
MOTOR CAR.
APPLICATION FILED DEC. 22, 1919.

1,385,611. Patented July 26, 1921.
4 SHEETS—SHEET 1.

Inventor
J. Gangloff,
By H. R. Kinlake
Attorney

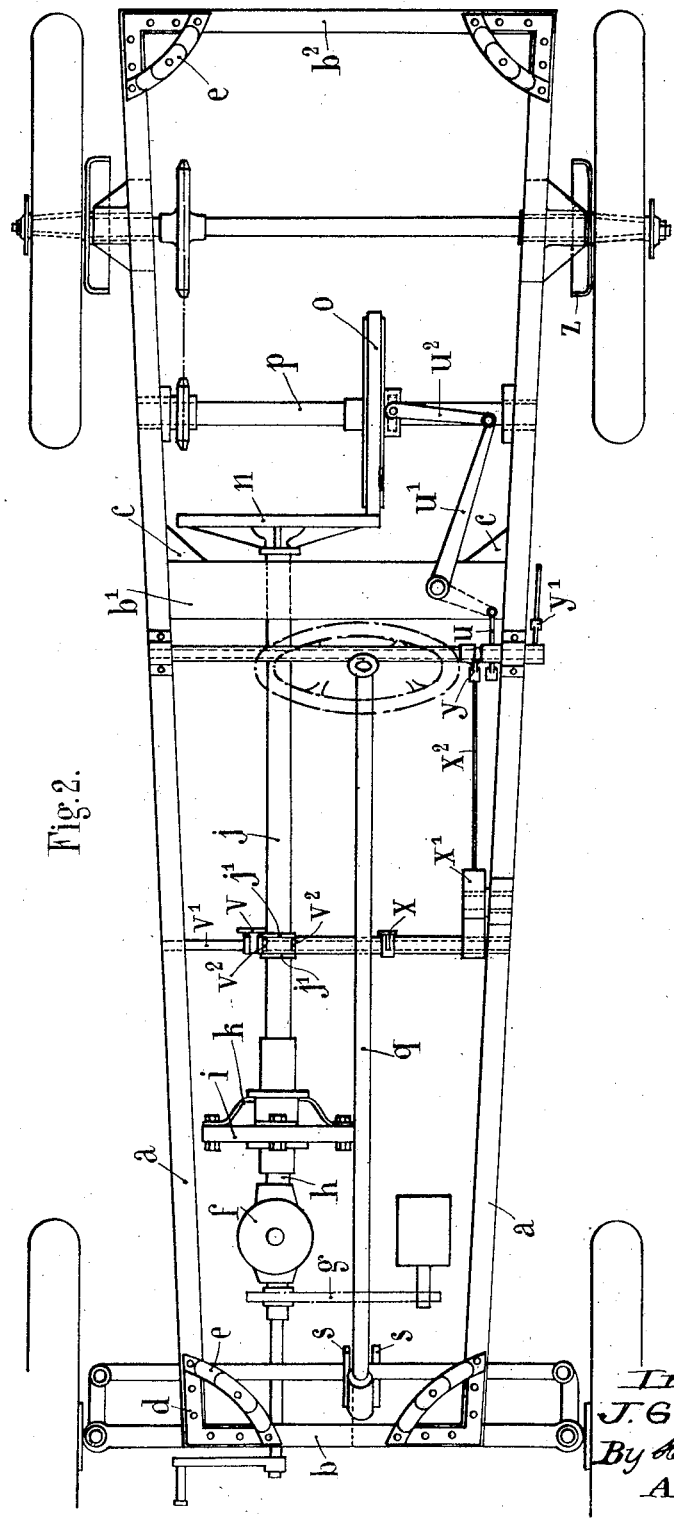

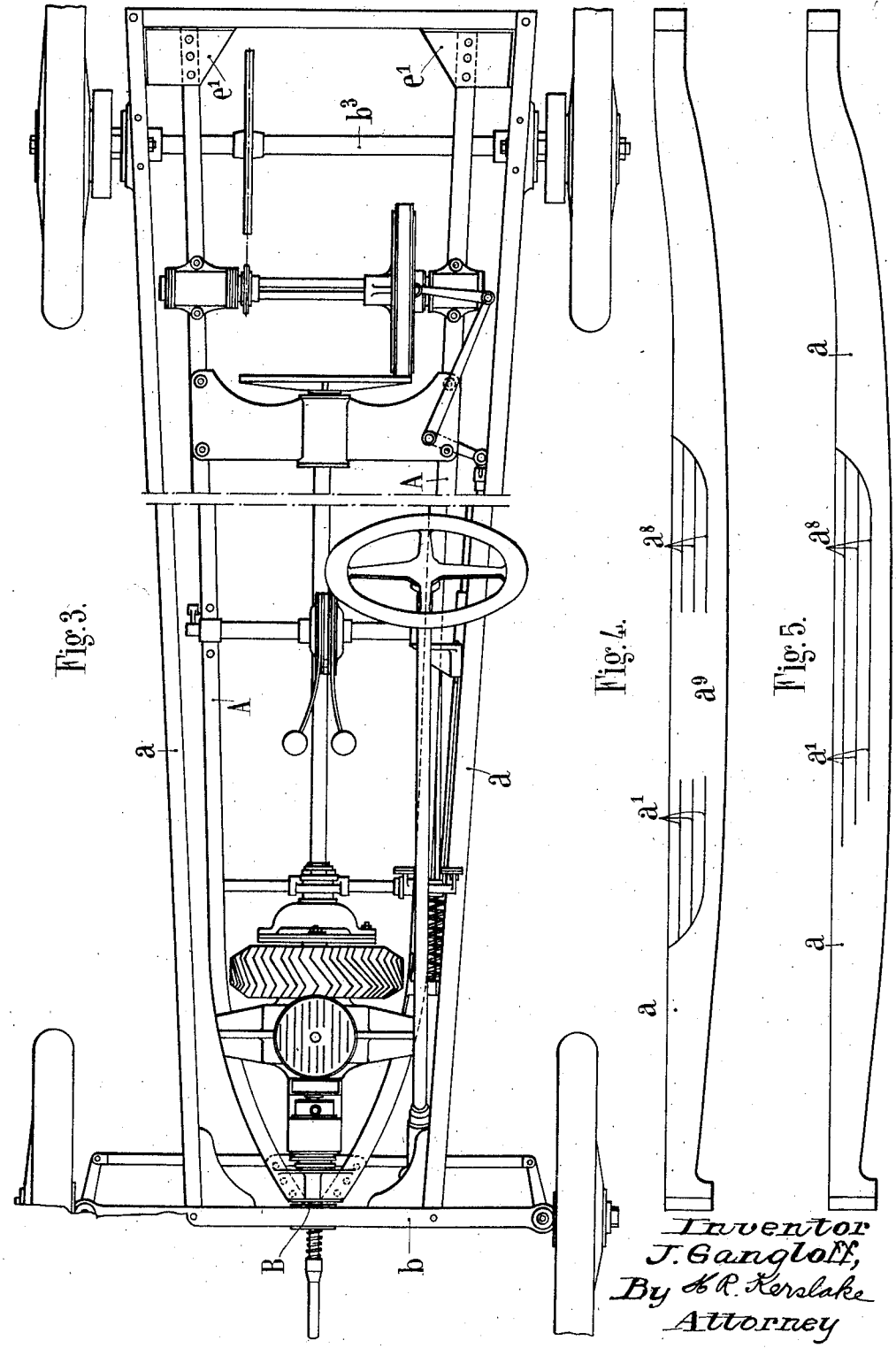

J. GANGLOFF.
MOTOR CAR.
APPLICATION FILED DEC. 22, 1919.

1,385,611.

Patented July 26, 1921.
4 SHEETS—SHEET 4.

Inventor
J. Gangloff,
By H. R. Kenlake
Attorney

UNITED STATES PATENT OFFICE.

JEAN GANGLOFF, OF LEVALLOIS-PERRET, FRANCE.

MOTOR-CAR.

1,385,611.  Specification of Letters Patent.  Patented July 26, 1921.

Application filed December 22, 1919. Serial No. 346,516.

*To all whom it may concern:*

Be it known that I, JEAN GANGLOFF, a citizen of the French Republic, residing at No. 52 Rue Raspail, Levallois-Perret, Seine, France, have invented certain new and useful Improvements in Motor-Cars, of which the following is a specification.

This invention has for its object to provide an improved light motor-car of simple and strong construction comprising only indispensable mechanical parts, and wherein among other things elastic devices are dispensed with, the chassis of the improved car being constructed in such a manner that it is sufficiently flexible, while having all necessary stiffness, to allow of this suppression of the springs.

The present improvements comprise also other simplifications hereinafter described which serve not only to facilitate the repairing of the improved car, but also of effecting in its construction a great saving of labor and materials and thus very considerably reducing the cost of manufacture.

The improvements also comprise an improved method of mounting the car body upon the chassis which helps in giving to the car as a whole a remarkable smoothness and resiliency.

The invention consists on the one hand in the construction of the car chassis which is made of hard and elastic wood, such as for example ash, which has the advantage of being highly resistant to bending strain, thereby giving to the car sufficient flexibility to allow of suspending it on springs, and on the other hand the invention consists in the use of simple strong parts as well as in a rational arrangement of those parts whereby a car is provided which is easy to drive and cheap to maintain.

One constructional form of an improved car according to the present invention is illustrated by way of example in the accompanying drawings in which:—

Fig. 2 is a corresponding plan.

Fig. 3 is a plan of a modified form of the chassis.

Figs. 4 and 5 are longitudinal views of two constructional modifications of the wooden longitudinals which are employed instead of the springs hitherto usually used for suspending the car.

Figure 1:
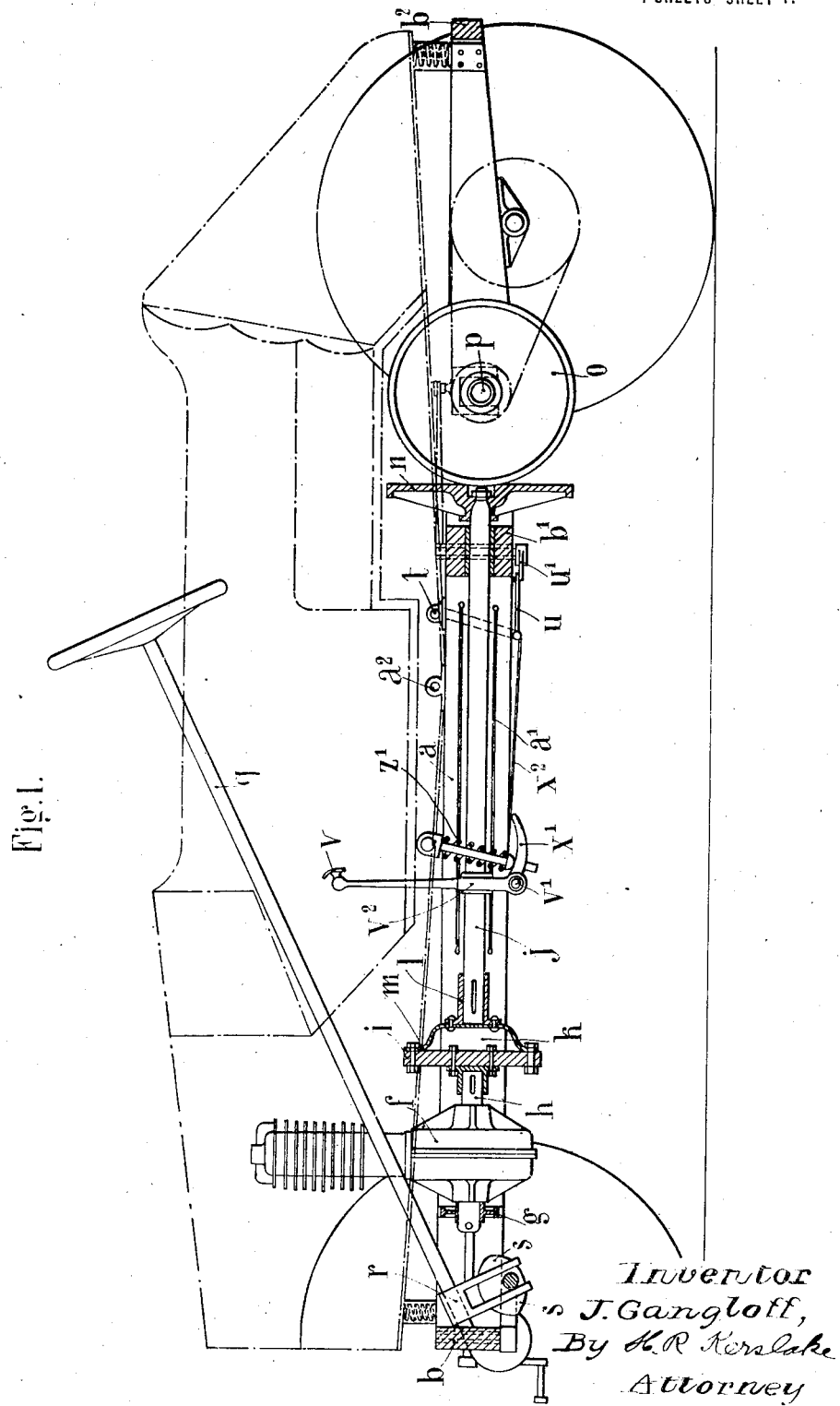
Figure 1 is a diagrammatic view in longitudinal section of an improved car wherein the chassis is shown provided with the steering and driving devices.

As shown, the improved chassis is constructed of hard flexible wood, such as ash, and consists of longitudinals $a$ and cross-stays $b$, $b^1$, $b^2$, the cross-stay $b$ serving as an axle for the front wheels. These longitudinals and cross-stays may be connected together as shown at $c$, by means of wooden chocks that impart sufficient rigidity to the chassis as a whole, but it is preferred to effect this connection in the manner shown in the case of the cross-stays $b$ and $b^2$. In this case it consists of a metal angle $d$ fixed to the ends of the longitudinals and the cross-stays, and having its sides connected together by a laminated spring $e$. This arrangement has the advantage of imparting to the chassis, in addition to a great degree of rigidity, such flexibility as to allow it to adapt itself better to the irregularities of the road. This flexibility of the chassis can be still further increased by making one or more saw cuts $a^1$ along a certain extent of the length of the longitudinals.

The engine $f$ which is mounted in any suitable manner on this chassis, is connected to the magneto in the usual way by means of a chain $g$, and the driving shaft $h$ is connected by means of the plate $i$ to the transmission shaft $j$. This plate consists preferably of a thick disk of leather firmly fixed together by bent metal strips $k$ arranged for instance in the form of a cross. These strips are riveted on one hand to a sleeve $l$ fixed on the transmission shaft, and they are fixed on the other hand to the plate $i$ by means of bolts, and are formed for the passage of the latter with slots $m$ that allow the strips a certain freedom of radial movement under the action of the thrust of the transmission shaft. The latter which is carried in the cross-stay $b^1$ by a bearing of hard wood, for instance lignum vitæ, is provided at its rear end with a clutch plate $n$ gearing with a disk $o$ mounted on a shaft $p$ along which this disk is adapted to be slid longitudinally. The shaft $p$ is connected to the driving wheels in the usual manner by wheels and chains.

The steering pillar $q$ journaled in the front cross-stay $b$, has fixed on it a fork $r$ surrounding the coupling rod of the steering wheels, and adapted to bear on either side of a plate $s$ fixed to said rod in such a manner as to transmit to the latter all the movements of the pillar $q$. This fork may be replaced by a suitably shaped finger or lever.

The gear of speed is effected by the movement of the disk $o$ across the plate $n$, this movement being produced by the following mechanism: The change speed lever is pivoted on an axle-pin $t$ and connected to the lever $u$ which transmits its motion to the bell crank lever $u^1$ which is in its turn pivoted in the cross-stay $b^1$, and causing through the medium of the lever $u^2$, the disk $o$ to slide along the shaft $p$.

The clutch mechanism consisting of the leather plate $i$ above referred to, operates as follows:—

The clutch pedal $v$ mounted on the shaft $v^1$ is fixed to a fork $v^2$ situated between the two plates $j^1$, $j^1$ of the transmission shaft $j$. The actuation of this pedal has thus the effect of pushing back this shaft $j$ and thereby disengaging the plate $n$ of the disk $o$ by overcoming the action of the elastic strips $k$ which have a constant tendency to keep the said plates in engagement with each other.

The throwing of the clutch into and out of gear by this apparatus is particularly smooth owing to the leather plate $i$ which contracts slightly under the action of the compression or expansion of the strips $k$.

As regards the braking of the car, this is effected by means of the ordinary pedal $x$ which together with the sector $x^1$, is fixed on the shaft $v^1$. This sector acts upon the cable $x^2$ for rocking the levers $y$ and $y^1$ constituting a bell crank lever upon the shaft $t$ for operating the brake $z$. A returning spring $z^1$ serves to return the pedal $x$ into its normal position.

It is to be noted that the improved car does not comprise any differential, because the tracks of the hind wheels are sufficiently close together to allow of dispensing with a differential.

In the construction hereinabove described, it will have been noted that the longitudinals carry directly the cross members upon which the engine-driven transmission is mounted. This method of mounting may have the drawback of creating as many fixing points for the spring constituted by each longitudinal as there are sections assembled to the cross-stays of the chassis, so that by this stiffening of the latter its elasticity is diminished.

This drawback may be remedied by arranging the longitudinals without any mechanical connection, so that they can work elastically throughout their length. This result is the object of the constructional form illustrated in Fig. 3 differing slightly from the preceding one. In this modification (Fig. 3), the wooden chassis which rests directly on the wheeled axles, and by reason of its elastic deformations, is designed to act as elimination springs, carries a rigid false chassis suitably stayed by means of cross-stays and upon which are mounted the engine-driven transmission parts. This false chassis is fixed to the elastic chassis at three points in such a manner that the deformations of the latter shall have no effect upon the engine-driven transmission, these elastic deformations thus effecting the whole length of the chassis longitudinals which remain free from all mechanical connection.

As indicated in the foregoing, the wooden chassis which rests directly upon the steering axle $b$ and the driving axle $b^3$, carries a metal false chassis A, constructed for instance of channel bars or angle bars. This false chassis A is fixed at its rear to the chassis proper by means of gussets $e^1$, and it is pivoted at its fore part at B to the middle of the cross-stay constituted by the axle $b$.

This false chassis A is stayed like an ordinary chassis by means of cross-stays and it supports the whole of the engine driven parts.

The false chassis A which is thus fixed at three points, escapes the elastic deformations to which the wooden chassis is subjected. In addition, the total length of the longitudinals $a$ of the latter comes into play to assure the flexibility of the suspension.

With the object of enabling this flexibility to be varied, saw cuts $a^1$ may be made in the longitudinals $a$ parallel to the neutral plane, as in the example above described. The longitudinal $a$ thus acts like a real spring of which it constitutes the main leaf, while the portions $a^8$ separated by the saw cuts $a^1$ act like subsidiary leaves in the elastic reactions.

In the constructional form shown in Fig. 4, the longitudinal $a$ thus constitutes a main leaf similar as regards its functions, to that of an ordinary symmetrical spring fixed at its center. The front axle $b$ and rear axle $b^3$ are attached to the free ends of this main leaf, whereas the central portion $a^9$ of the longitudinal $a$ constitutes the main section and corresponds to the part that is fixed in the ordinary manner between the fixing flanges.

The constructional form shown in Fig. 5 illustrates a longitudinal $a$ which is analogous to a half-spring attached at one end. The main section of fixing corresponds to the end of the longitudinal $a$ carrying the front axle $b$.

Figure 6:
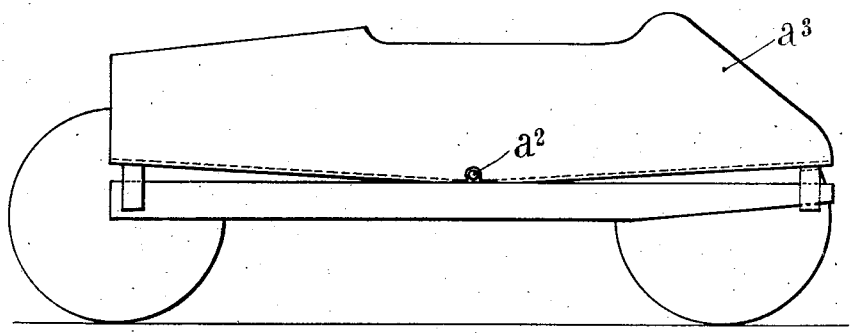
Fig. 6 is a diagrammatic view illustrating the mounting of the car body on the chassis.
Figure 7:
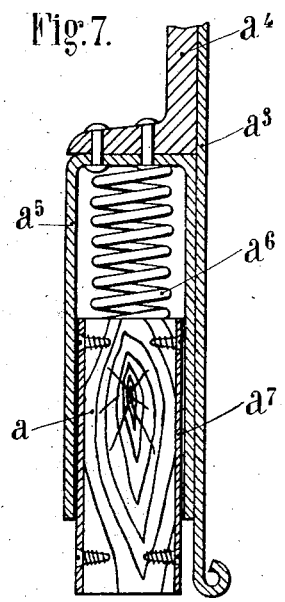
Fig. 7 is a detail view in vertical section of one of the devices for suspending the ends of the car body.

The car body is fixed to the chassis in the manner shown in Fig. 6. This car body bears upon and is fixed rigidly to the chassis only by a hinge $a^2$ situated approximately at its center of gravity upon each of the two longitudinals $a$. At its ends the car body is separated well away from the chassis and is connected to it merely by an elastic device shown separately in Fig. 7.

The car body $a^3$ is provided as usual with an angle $a^4$ which serves generally for attaching it to the chassis, but in the present case has riveted or otherwise attached to its front and rear ends, stirrup-shaped members $a^5$ that embrace the two sides of the longitudinals $a$. Between the side limbs of these stirrups there are arranged above the longitudinals springs $a^6$ whose flexure will allow the car body to rock slightly on its hinge $a^2$. These stirrups by sliding on the longitudinals serve to guide the springs and also the whole structure. For the purpose of protecting the longitudinals against any damage due to the almost continual friction of the stirrups $a^5$, it is advisable to provide them at the suitable place with a more resistant metal covering $a^7$.

It is to be understood that the various general arrangements hereinabove described are given solely by way of example and merely for facilitating the understanding of the invention, and that they may be modified as regards details and the construction of their component parts without thereby departing from the nature of the invention.

What I claim is:—

1. In a light motor vehicle, a chassis including longitudinals of sufficient elasticity to permit of elimination of springs, and front and rear cross bars of hard and flexible wood assembled together by means of metal brackets, the arm ends of which are connected by plate springs, the front cross bar forming an axle for the vehicle steering wheels.

2. A light motor vehicle, a chassis including longitudinals of sufficient elasticity to permit elimination of springs, and front and rear cross bars of hard and flexible wood assembled together by means of metal brackets, the arm ends of which are connected by plate springs, the front cross bar forming the axle for the steering wheels, and the longitudinals being provided at approximately centrally of their length with saw cuts to increase their elasticity.

3. In a light motor car, a wooden chassis composed of longitudinals and cross-stays, saw cuts being made in the longitudinals parallel to the neutral plane, whereby said longitudinals constitute the main leaf of a symmetrical spring or half-spring, the portions separated by said saw cuts acting like the subsidiary leaves of an ordinary spring in relation to the corresponding main leaf.

4. In a light motor car, the combination with a wooden chassis having sufficient elasticity to allow of dispensing with suspension springs, of a rigid metal false chassis designed to carry the parts of the engine-driven transmission, and supported at three points by the elastic chassis.

5. In a light motor car comprising an elastic chassis carrying the wheeled axles of the car, a rigid false chassis independent of said wheeled axles, designed to carry the parts of the engine-driven transmission, two gussets connecting the flexible chassis to the rigid chassis at the rear, and a hinge joint connecting the two chassis at the fore part of the car.

In testimony whereof I have signed my name to this specification.

JEAN GANGLOFF.

Witnesses:
 GEORGES BONNEUIL,
 HENRY T. WILCOX.